US008180290B2

(12) United States Patent
Cho

(10) Patent No.: US 8,180,290 B2
(45) Date of Patent: May 15, 2012

(54) WIRELESS COMMUNICATION METHOD FOR PREVENTING COMMUNICATION INTERFERENCE AND CUT-OFF IN ONE-TO-MULTI WIRELESS COMMUNICATION

(75) Inventor: Dong-Sik Cho, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 2834 days.

(21) Appl. No.: 10/226,126

(22) Filed: Aug. 23, 2002

(65) Prior Publication Data
US 2003/0045242 A1 Mar. 6, 2003

(30) Foreign Application Priority Data

Aug. 25, 2001 (KR) .............................. 2001-0051520

(51) Int. Cl.
*H04B 7/00* (2006.01)
*H04B 15/00* (2006.01)
(52) U.S. Cl. ........ 455/41.2; 455/502; 455/503; 455/515
(58) Field of Classification Search ................. 455/41.2, 455/502, 503, 515
See application file for complete search history.

(56) References Cited

U.S. PATENT DOCUMENTS

| 6,570,857 | B1 * | 5/2003 | Haartsen et al. | 370/312 |
| 6,571,103 | B1 * | 5/2003 | Novakov | 455/464 |
| 6,650,630 | B1 * | 11/2003 | Haartsen | 370/345 |
| 6,745,038 | B2 * | 6/2004 | Callaway et al. | 455/456.1 |
| 6,795,688 | B1 * | 9/2004 | Plasson et al. | 455/41.2 |
| 6,804,542 | B1 * | 10/2004 | Haartsen | 455/574 |
| 6,823,186 | B2 * | 11/2004 | Salokannel et al. | 455/452.1 |

(Continued)

FOREIGN PATENT DOCUMENTS
WO    WO 00/31932 A1    6/2000

OTHER PUBLICATIONS

Ericsson, IBM Corp., Intel Corp., Nokia Corp., Toshiba Corp.: "Specification of the Bluetooth System, Version 1.0 B, Part B: Baseband Specification (pp. 98-122), Part C: Link Manager Protocol (pp. 186-244)", Bluetooth Specification—Core, 'Online!, vol. 1, Dec. 1, 1999, pp. 98-244, XP002255785.

(Continued)

*Primary Examiner* — Wen Huang
(74) *Attorney, Agent, or Firm* — Sughrue Mion, PLLC

(57) ABSTRACT

A wireless communication method capable of preventing communication interference and cut-off in one-to-multi wireless communication. The wireless communication method has the steps of: determining as to whether communication parameters satisfy a precondition for communication before a master device communicates with a slave device in a corresponding mode, the communication parameters being required for the slave devices to communicate with the master device, the precondition being that the slave devices should communicate with the master device without overlapping of communication time thereof; controlling the communication of the slave devices according to the corresponding mode by differently setting operation information of the slave devices according to the corresponding mode, when determining that the communication parameters satisfy the precondition for communication; and maintaining a connection between the slave device and the master device until the communication completes, when the time of operation of the slave devices ends due to the corresponding mode shift when the communication is not completed between the master device and the slave device. Accordingly, the interference and cut-off of communication with the slave devices of different communication times and cycles in corresponding mode can be prevented.

8 Claims, 3 Drawing Sheets

U.S. PATENT DOCUMENTS

| | | | |
|---|---|---|---|
| 6,834,192 B1* | 12/2004 | Watanabe et al. | 455/444 |
| 6,920,171 B2* | 7/2005 | Souissi et al. | 375/133 |
| 6,954,616 B2* | 10/2005 | Liang et al. | 455/63.1 |
| 2002/0034172 A1* | 3/2002 | Ho | 370/338 |

OTHER PUBLICATIONS

Haartsen J et al.:, "Bluetooth: Vision, Goals, and Architecture" Mobile Computing and Communications Review, ACM, New York, NY, US, vol. 2, No. 4, Oct. 1, 1998, pp. 38-45, XP000784002.

Zhang Pei et al.; "Bluetooth—the fastest developing wireless technology", IEEE Conference Proceedings, vol. 2, Aug. 21, 2000, pp. 1657-1664, XP010526681.

Haartsen JC Mattisson S:, "Bluetooth—A new low-power radio interface providing short-range connectivity", Proceedings of the IEEE, IEEE. New York,. US, vol. 88, No. 10, Oct. 2000, pp. 1051-1661, XP002958459.

\* cited by examiner

WIRELESS COMMUNICATION METHOD FOR PREVENTING COMMUNICATION INTERFERENCE AND CUT-OFF IN ONE-TO-MULTI WIRELESS COMMUNICATION

BACKGROUND OF THE INVENTION

1. Field of the Invention

The present invention relates to a wireless communication method of communication time adjustment in Bluetooth devices, and more particularly, to a wireless communication method of a wireless communication device for performing one-to-multi Bluetooth communication by adjusting a time period for a communication between a master device and slave devices when the master device intends to communicate with the slave devices. The present application is based on Korean Patent Application No. 2002-51520, filed Aug. 25, 2001, which is incorporated herein by reference.

2. Description of the Related Art

The Bluetooth technology enables transmission of information such as text data, voice data and video data at a maximum speed of 1 Mbps within a distance range of 10-100 m.

Bluetooth devices, which can communicate with one another through the Bluetooth communication method, construct a communication connection through processes like inquiry scan, page, page scan, etc. During these processes, master and slave devices are determined according to functions thereof.

In order to construct a new connection with another Bluetooth device, each Bluetooth device has to adjust its operational clock and frequency pattern with each other. And among the processes for constructing a new connection among the Bluetooth devices, the inquiry process is that the master device repeatedly sends out its operational frequencies to the slave devices in order to have the slave devices adjust their frequency patterns to the master device.

The inquiry scan is performed by the slave devices, in which the slave devices detect the received frequencies and synchronize to the detected frequencies. The page is the process in which the master device sends out a clock signal so that the slave devices can adjust to the operational clock of the master. In the page scan, the slave devices detect the received clock and synchronize to it. Through these processes, a connection called a 'piconet' is constructed, having more than one slave device connected to the master device.

According to the currently suggested Bluetooth communication method, one master device can connect to up to seven slave devices in an active state, for bilateral communication. Further, in order to connect a new slave device to the piconet, the master device first disconnects one of seven active slave devices from the piconet and then connects the new slave device to the piconet in an active state.

According to the Bluetooth communication method, the master and slave devices operate in several modes, i.e., in an active mode in which the master device communicates with the slave devices on a regular basis, and hold, sniff and park modes for power saving. Usually, the hold mode is used when there is no need to send data in a relatively long period of time. In sniff mode, the master and slave devices transmit and receive data only for a predetermined period of time. During the park mode, the slave device periodically communicates with the master device in order to ask for maintenance of synchronization with the master device and shift to the active mode.

The slave device, which operates in one of the hold, sniff and park modes, repeatedly operates in its communication mode according to a predetermined cycle. Although the slave device operating in hold mode actually operates one time, since the slave device in hold mode wakes up at a predetermined time to communicate with the master device, it is considered that the slave device in hold mode also operates periodically like slave devices in other modes.

When all the connected slave devices shift their modes, the master device determines communication time of the respective slave devices through communication and negotiation with the slave devices. Accordingly, through the negotiation with the master device, all the connected slave devices are set to operate according to a predetermined periodical cycle. That is, according to the conventional communication method, the master and slave devices communicate for a time and according to a cycle that are fixed by mutual negotiations among the master and slave devices until the slave devices shift their modes.

Here, the operational cycles of each slave device in each mode can vary according to the negotiation with the master device. Accordingly, although the slave devices begin communication with the master device at different times and according to different cycles in the one-to-multi communication of the Bluetooth communication, different communication of the respective slave devices sometimes causes coincidental overlap of communication of a plurality of slave devices within a certain period of time. And the slave devices communicating with the master device simultaneously may cause interference in the communication with the master device. Accordingly, due to the communication interference among the slave devices, the slave devices can be disconnected from the master device.

SUMMARY OF THE INVENTION

The present invention has been made to overcome the above-mentioned problems of the related art, and accordingly, it is an object of the present invention to provide a wireless communicating method that uses a wireless communication device, by which a master device shifts operational mode and communicates in the shifted mode with slave devices that are set to be controlled by the master device, and the slave devices of different communication time and cycles in the respective modes are prevented from communication interferences and cut-off.

The above object is accomplished by a wireless communication method according to the present invention, comprising the steps of a) determining whether communication parameters satisfy a precondition for communication before a master device communicates with a slave device in a corresponding mode, the communication parameters being required for the slave devices to communicate with the master device, the precondition being that the slave devices should communicate with the master device without overlapping of communication time thereof; and b) controlling the communication of the slave devices according to the corresponding mode by differently setting operation information of the slave devices according to the corresponding mode, when determining that the communication parameters satisfy the precondition for communication.

Preferably, after the step a), there is provided the step of a-1) changing the communication parameters according to the master device negotiations with the slave devices so that the communication parameters can satisfy the precondition, when determining that the communication parameters do not satisfy the precondition; and a-2) determining whether new communication parameters changed through negotiations with the slave devices fall within a range that is changeable by the slave devices. The step b) is performed when it is determined that the new communication parameters fall within the range changeable by the slave devices.

According to the wireless communication method according to a preferred embodiment of the present invention, there is provided a step c) of transmitting a message to a user and to the slave device requesting the communication, indicating that it is impossible to control according to the corresponding mode of the slave device requesting the communication, when determining in the step a-2) that the new communication parameters do not fall within the range changeable by the slave device.

The corresponding mode between the master device and the slave devices include at least one of a power save, an inquiry, an inquiry scan, a page and page scan. The power save corresponding mode includes at least one of a park mode, a hold mode and a sniff mode. Also, the communication parameters include at least one of a start point of operation, a time of operation, and a cycle of the corresponding mode, for the communication between the master device and the slave devices.

There are three preconditions for communication. The first precondition is that a total sum of the time of operation and the cycle of the slave devices have to satisfy a predetermined value. The second precondition is that the cycle of slave devices according to the communication parameters has to be as integral-number of times greater than a minimum cycle, the minimum cycle being a base value of the cycle. The third precondition is that the minimum cycle has to be greater than a total sum of 1) a total sum of the operation time and 2) a total sum of maximum time for the slave device to re-receive a certain packet or to receive a next packet from the master device, while the minimum cycle is less than a supervision timeout value which is a maximum allotment of time for the determined slave device to connect to the master device.

Meanwhile, after the step b), there is provided a step of maintaining a connection between the slave device and the master device until the communication completes, when the time of operation of the slave devices ends due to the corresponding mode shift in a condition that the communication is not completed between the master device and the slave device.

According to the present invention, by determining the potential for each slave device to operate based on the precondition for communication, setting the communication parameters for the corresponding slave device to satisfy the precondition, and by differently setting the communication start points of the corresponding slave devices, the interference and cut-off of communication with the slave devices of different communication time and cycle in corresponding mode can be prevented.

BRIEF DESCRIPTION OF THE DRAWINGS

The above-mentioned object and the feature of the present invention will be more apparent by describing the preferred embodiment of the present invention by referring to the appended drawings, in which.

DETAILED DESCRIPTION OF THE PREFERRED EMBODIMENTS

From now on, the present invention will be described in great detail by referring to the appended drawings.

Figure 1:
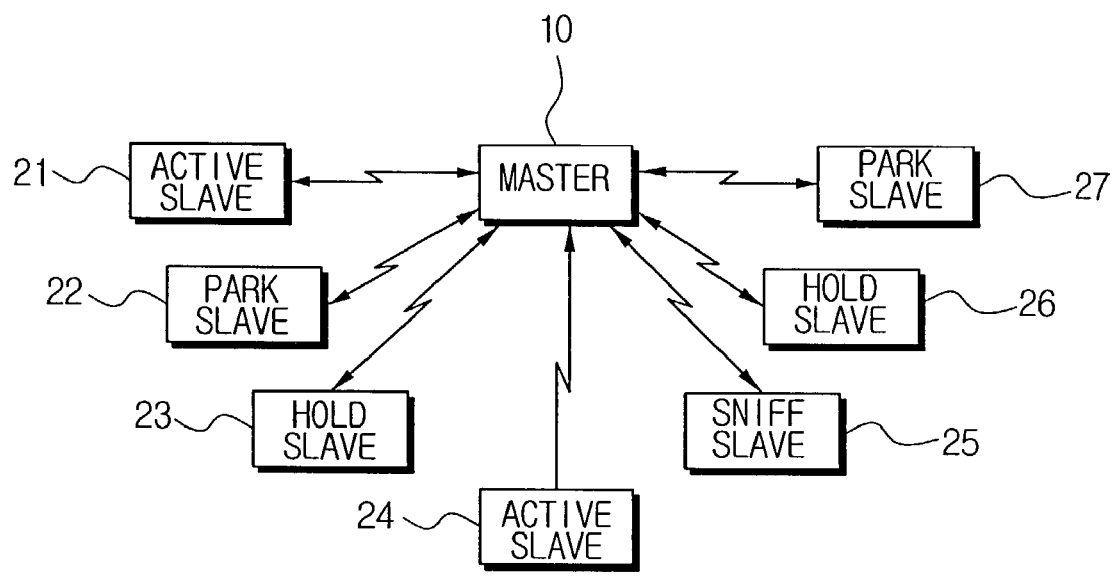
FIG. 1 is a block diagram showing the status of connection between a master device and slave devices in respective modes.

FIG. 1 is a block diagram showing the status of connection between a master device and slave devices in respective modes according to the Bluetooth method. The master device 10 performs an inquiry process in which the master device 10 sends out its operational frequencies through a channel (i.e. through the air) to peripheral slave devices 21, 22, 23, 24, 25, 26 and 27. The slave devices 21, 22, 23, 24, 25, 26 and 27 perform an inquiry scan process in which they are synchronized to the master's operational frequencies received from the master device 10. Next, the master device 10 performs a page process, sending out its driving timing clock to the slave devices 21, 22, 23, 24, 25, 26 and 27. Accordingly, the slave devices 21, 22, 23, 24, 25, 26 and 27 perform a page scan process in which they are synchronized to the master's driving timing clock received from the master device 10.

Accordingly, the slave devices 21, 22, 23, 24, 25, 26 and 27 connected to the master device 10 through mutual negotiations are divided into active slave devices 21 and 24 that perform an active communication and power save slave devices 22, 23, 25, 26 and 27 that are in a mode that saves power consumption during non-communication periods. The slave devices 22, 23, 25, 26 and 27 in power save mode are again divided into park slave devices 22 and 27 operating in a park mode, hold slave devices 23 and 26 operating in a hold mode and a sniff slave device 25 operating in a sniff mode.

While the master device 10 and the active slave devices 21 and 24 synchronously communicate in one-to-one basis, the master device 10 can also transmit data to desired slave devices with broadcast packets.

The park slave devices 22 and 27 communicate with the master device 10 to maintain the synchronization to the master device 10, and also to ask to shift to the active mode. The communication between the master device 10 and the park slave devices 22 and 27 periodically takes place, and it takes only a very small portion of the total communication time of the master device 10.

The hold slave devices 23 and 26 are the devices that shifted to the hold mode through the negotiations with the master device 10 since there was no need for the master device 10 to transmit data for some time. The master device 10 and the hold slave devices 23 and 26 transmit and receive data in a certain amount of time that is pre-arranged in the communication time of the master device 10. The master device 10 and the sniff slave device 25 communicate by using the time when the communication in active mode does not occur.

After the slave devices 21, 22, 23, 24, 25, 26 and 27 shift to the respective modes through the mutual negotiations with the master device 10, again through the mutual negotiations, communication parameters for communication are set according to the communication modes. Accordingly, the master device 10 and the slave devices 21, 22, 23, 24, 25, 26 and 27 in the respective modes perform the communication.

The communication parameters include start points of respective modes, operation time for respective modes and cycles of respective modes.

The park slave devices 22 and 27, the hold slave devices 23 and 26 and the sniff slave device 25 perform communication with the master device 10 according to their own cycles. Also, the inquiry, inquiry scan, page and page scan, which are performed by the master device 10 and the slave devices 21, 22, 23, 24, 25, 26 and 27 for the connection therebetween, are also performed according to a predetermined cycle.

Figure 2:
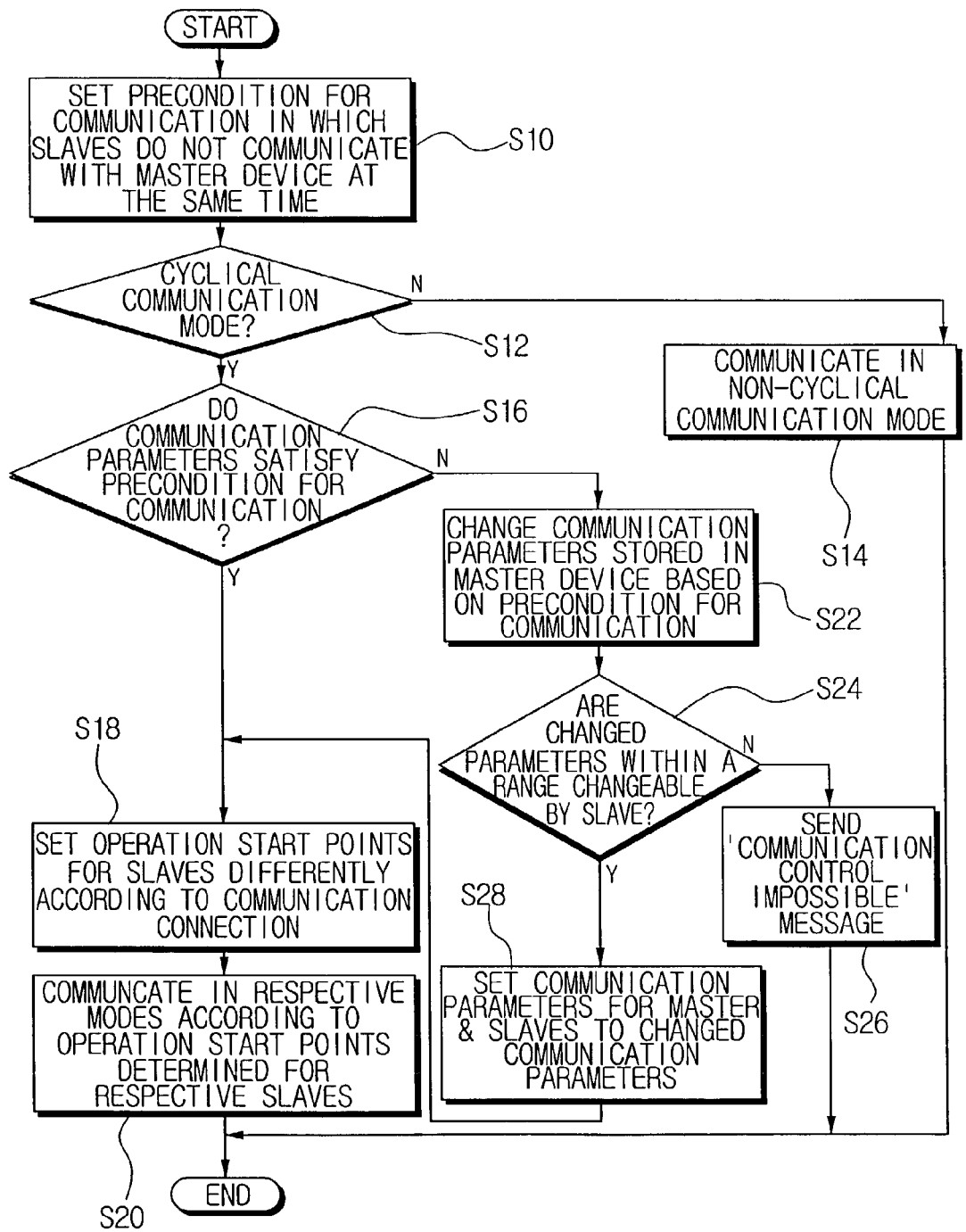
FIG. 2 is a flowchart showing a wireless communication method that is capable of preventing communication interference and cut-off in a one-to-multi wireless communication between the master device and slave devices according to the present invention.

FIG. 2 is a flowchart showing a wireless communication method for performing mutual communications between the master device 10 and the slave devices 21, 22, 23, 24, 25, 26 and 27 in the respective modes, in which the master device 10 adjusts a communication time with the slave devices 21, 22, 23, 24, 25, 26 and 27 for a synchronized connection of the slave devices 21, 22, 23, 24, 25, 26 and 27. First, before performing a periodic communication with the slave devices 22, 23, 25, 26 and 27, the master device 10 sets a precondition for communication in such a manner that the slave devices 21, 22, 23, 24, 25, 26 and 27 do not overlap with each other during communication (step S10). After setting the precondition in S10, the master device 10 determines whether the currently connected slave device is in the cyclical mode, i.e., any mode that the slave device communicates according to a certain cycle (step S12).

More specifically, the precondition for communication is that the communications of the periodically communicating slave devices 22, 23, 25, 26 and 27 do not overlap while the slave devices 22, 23, 25, 26 and 27 periodically communicate with the master device 10 according to their own cycles. The first precondition for communication is that, whether they are in operation or will be, the total sum of the communication time of the slave devices 22, 23, 25, 26 and 27 in each mode and according to its cycle should be less than '1'. The relation is expressed by the following formula:

$$\frac{Cp_1}{Tp_1} + \frac{Ch}{Th} + \frac{Cs}{Ts} + \frac{Ci}{Ti} + \frac{Cis}{Tis} + \frac{Cp_2}{Tp_2} + \frac{Cps}{Tps} < 1 \qquad \text{[Formula 1]}$$

where, C is an operation time of slave device in a certain communication mode,

T: Cycle of slave device in the certain communication mode,
$Cp_1$: Operation time of park slave device,
$Tp_1$: Cycle of park slave device,
Ch: Operation time of hold slave device,
Th: Time of time-out of hold slave device,
Cs: Operation time of sniff slave device,
Ts: Cycle of sniff slave device,
Ci: Operation time of slave device in inquiry operation,
Ti: Cycle of inquiry of slave device,
Cis: Operation time of slave device in inquiry scan operation,
Tis: Cycle of inquiry scan of slave device,
$Cp_1$: Operation time of slave device in page operation,
$Tp_1$: Cycle of page of slave device,
Cps: Operation time of slave device in page scan operation, and
Tps: Cycle of page scan of slave device.

If $$\frac{Cp_1}{Tp_1} + \frac{Ch}{Th} + \frac{Cs}{Ts} + \frac{Ci}{Ti} + \frac{Cis}{Tis} + \frac{Cp_2}{Tp_2} + \frac{Cps}{Tps}$$

equals '1', it means the master device 10 keeps communication with the slave devices along a temporal axis without a pause. And it also means that there is no time to vary the communication parameters including the communication cycle of the slave devices 21, 22, 23, 24, 25, 26 and 27. In order to prevent a communicational problem, therefore, the formula 1 always has to be met.

The second precondition of communication is that the cycles of the slave devices 22, 23, 25, 26 and 27 should be an integral-number of times greater than the predetermined minimum periodic cycle (Tb). The relation is expressed by the formula 2:

$$Ti=NTb \qquad \text{[Formula 2]}$$

where, T is a cycle of slave device,
i: Operational modes of slave devices (park, hold, sniff, inquiry, inquiry scan, page, page scan),
N: Natural number, and
Tb: Predetermined minimum cycle.

The third precondition of communication is that the predetermined minimum cycle Tb should be greater than a total time value (Ta), while it should be less than a supervision timeout value sTo (Formula 3). Here, the Ta is the sum total of the maximum time $T_2$ required for a certain slave device to re-receive a certain packet or a next packet from the master device 10. Also, the sTo is the maximum allotment of time required for the slave devices 22, 23, 25, 26 and 27 to connect to the master device 10.

$$Ta<Tb<sTo \qquad \text{[Formula 3]}$$

where, Ta: $T_1+T_2$.

If it is determined that the slave device does not operate according to a certain cycle in S12, the master device 10 and the slave device communicate according to the mode corresponding to the non-cyclical communication mode (step S14). If it is determined in S12 that the slave device operates according to a certain cycle, the master device 10 determines whether the communication parameters, which are set according to the negotiations with the slave device, satisfy the precondition of communication (step S16).

If it is determined that the communication parameters as set satisfy the precondition of communication in S16, the master device 10 sets communication start points differently according to the communicational connection to the corresponding slave devices in the respective communication modes (step S18). When the communication start points of the slave devices are set differently in S18, the master device 10 controls the slave devices so that the communication can be performed periodically according to the corresponding communication modes and also based on the differently-set start points of the slave devices (step S20).

When it is determined that the communication parameters as set in S16 do not satisfy the precondition of communication, the master device 10 varies the communication parameters stored in the master device 10 according to the precondition of communication (step S22). At this time, the master device 10 determines whether the communication parameters, which are varied through the negotiation with the slave device, are in the range that is changeable (step S24).

When it is determined that the communication parameters as changed fall within the changeable range in S24, the master device 10 and the slave device set the changed parameters for communication with each other in a certain communication mode (step S28). When the communication parameters for the master device 10 and the slave device are set in S28, the master device 10 performs steps S18 and S20. When it is determined that the changed communication parameters exceed the changeable range in S24, the master device 10 transmits a message to the corresponding slave device, indicating that it is impossible for the slave device to shift mode and operate in a new mode (step S26).

Accordingly, the communications of the respective slave devices do not overlap, and until the completion of the communication by the slave device in active mode, the slave device is not disconnected from the master device 10 which mainly occurs due to supervision timeout, i.e., the maximum timeout allotted for the communication connection.

Figure 3:
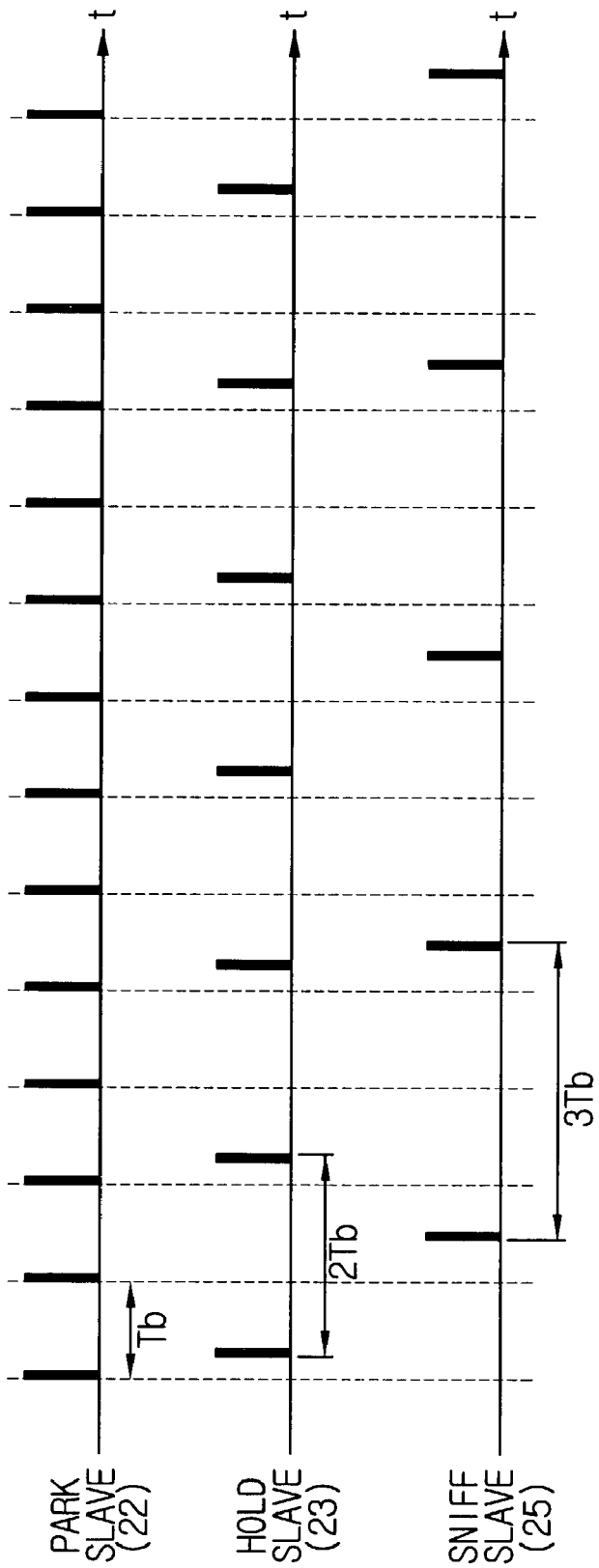
FIG. 3 is a view showing one example in which the master device sets operation start points of respective slave devices according to the step S18 of FIG. 2 for periodic communications.

FIG. 3 is a view showing one example, in which the master device 10 controls the communication start points of the slave devices so that the slave devices can periodically communicate. FIG. 3 shows the park slave device 22 of minimum cycle Tb, the hold slave device 23 having a periodic timeout value 2Tb twice as long as the minimum cycle of the park slave device 22 and the sniff slave device 25 having a cycle three times as long as the minimum cycle of the park slave device 22, transmitting data packets periodically under the control of the master device 10. In this situation, the master device 10 sets communication points of the slave devices differently according to their initial modes.

Accordingly, the slave devices can communicate with the master device 10 in the respective modes, without an overlap of communication.

According to the present invention, before communicating with the slave devices in cyclical modes, the master device 10 determines whether the communication parameters for controlling the communication between the master device 10 and the slave devices satisfy the communicational prerequisite. If satisfying, the master device 10 sets different communication start points for the respective slave devices and performs the communication with the slave devices. Thus, the communication interference and cut-off, that sometimes happen during the communications of the slave devices of different communication start points and cycles, can be prevented.

So far, the preferred embodiment of the present invention has been illustrated and described. However, the present invention is not limited to the preferred embodiment described here, and someone skilled in the art can modify the present invention without departing from the spirit of the present invention claimed in the claims section.

What is claimed is:

1. A wireless communication method, comprising the steps of:
    a) determining as to whether communication parameters satisfy a precondition for communication before a single master device communicates with a slave device in a corresponding mode, the communication parameters being required for the slave devices to communicate with the master device, the precondition being that the slave devices should communicate with the master device without overlapping of communication time thereof; and
    b) controlling the communication of the slave devices according to the corresponding mode by differently setting operation information of the slave devices according to the corresponding mode, when determining that the communication parameters satisfy the precondition for communication.

2. The wireless communication method as claimed in claim 1, after the step b), further comprising a step of maintaining a connection between the slave device and the master device until the communication completes, when the time of operation of the slave devices ends due to the corresponding mode shift under a condition that the communication is not completed between the master device and the slave device.

3. A wireless communication method, comprising the steps of:
    a) determining as to whether communication parameters satisfy a precondition for communication before a single master device communicates with a slave device in a corresponding mode, the communication parameters being required for the slave devices to communicate with the master device, the precondition being that the slave devices should communicate with the master device without overlapping of communication time thereof; and
    b) controlling the communication of the slave devices according to the corresponding mode by differently setting operation information of the slave devices according to the corresponding mode, when determining that the communication parameters satisfy the precondition for communication,
    after the step a), further comprising the steps of:
    a-1) changing the communication parameters according to the master device negotiations with the slave devices so that the communication parameters can satisfy the precondition, when determining that the communication parameters do not satisfy the precondition; and
    a-2) determining whether new communication parameters changed through negotiations with the slave devices fall within a range that is changeable by the slave devices,
    wherein the step b) is performed when it is determined that the new communication parameters fall within the range changeable by the slave devices.

4. The wireless communication method of claim 3, further comprising a step c) of transmitting a message to a user and to the slave device requesting the communication, indicating that it is impossible to control the communication according to the corresponding mode of the slave device requesting the communication, when determining in the step a-2) that the new communication parameters do not fall within the range changeable by the slave device.

5. The wireless communication method of claim 4, wherein the corresponding mode between the master device and the slave devices include at least one of a power save, an inquiry, an inquiry scan, a page and a page scan.

6. The wireless communication method of claim 5, wherein the power save corresponding mode includes at least one of a park mode, a hold mode and a sniff mode.

7. The wireless communication method of claim 6, wherein the communication parameters include at least one of a start point of operation, a time of operation, and a cycle of the corresponding mode, for the communication between the master device and the slave devices.

8. The wireless communication method of claim 7, wherein the precondition comprises at least one of conditions that:
    a total sum of the time of operation and the cycle of the slave devices to satisfy a predetermined value;
    the cycle of each of the slave devices according to the communication parameters is as integral-number of times greater than a minimum cycle, the minimum cycle being a base value of the cycle; and
    the minimum cycle is greater than a total sum of 1) a total sum of the operation time and 2) a total sum of maximum time for the slave device to re-receive a certain packet or to receive a next packet from the master device, while the minimum cycle is less than a supervision timeout value which is a maximum allotment of time for the determined slave device to connect to the master device.

* * * * *